(12) United States Patent
Newlin

(10) Patent No.: US 8,818,092 B1
(45) Date of Patent: Aug. 26, 2014

(54) MULTI-THREADED TEXT RENDERING

(75) Inventor: John Newlin, Belmont, CA (US)

(73) Assignee: Google, Inc., Mt. View, CA (US)

( * ) Notice: Subject to any disclaimer, the term of this patent is extended or adjusted under 35 U.S.C. 154(b) by 341 days.

(21) Appl. No.: 13/248,854

(22) Filed: Sep. 29, 2011

(51) Int. Cl.
*G06K 9/00* (2006.01)
*G09G 5/00* (2006.01)

(52) U.S. Cl.
USPC .......................................... 382/167; 345/629

(58) Field of Classification Search
None
See application file for complete search history.

(56) References Cited

U.S. PATENT DOCUMENTS

| | | | | |
|---|---|---|---|---|
| 5,109,439 A * | 4/1992 | Froessl | | 382/305 |
| 5,444,840 A * | 8/1995 | Froessl | | 1/1 |
| 5,768,490 A * | 6/1998 | Hersch et al. | | 345/468 |
| 5,883,640 A * | 3/1999 | Hsieh et al. | | 345/503 |
| 6,081,616 A * | 6/2000 | Vaezi et al. | | 382/171 |
| 6,163,749 A * | 12/2000 | McDonough et al. | | 701/438 |
| 6,246,791 B1 * | 6/2001 | Kurzweil et al. | | 382/162 |
| 6,249,604 B1 * | 6/2001 | Huttenlocher et al. | | 382/174 |
| 6,346,948 B1 * | 2/2002 | Evans et al. | | 345/582 |
| 6,493,734 B1 * | 12/2002 | Sachs et al. | | 715/212 |
| 6,552,819 B2 * | 4/2003 | Osawa et al. | | 358/1.17 |
| 7,027,660 B2 * | 4/2006 | Hersch et al. | | 382/257 |
| 7,418,653 B1 * | 8/2008 | Stern et al. | | 715/204 |
| 7,496,230 B2 * | 2/2009 | Chen et al. | | 382/182 |
| 8,234,571 B1 * | 7/2012 | Menninga et al. | | 715/256 |
| 8,339,653 B2 * | 12/2012 | Nguyen et al. | | 358/1.18 |
| 8,339,671 B2 * | 12/2012 | Nguyen et al. | | 358/2.1 |
| 8,411,319 B2 * | 4/2013 | Nguyen et al. | | 358/1.9 |
| 2002/0191848 A1 * | 12/2002 | Boose et al. | | 382/181 |
| 2003/0115552 A1 * | 6/2003 | Jahnke et al. | | 715/536 |
| 2004/0076327 A1 * | 4/2004 | Stern et al. | | 382/173 |
| 2004/0243934 A1 * | 12/2004 | Wood et al. | | 715/517 |
| 2004/0257371 A1 * | 12/2004 | Payne et al. | | 345/506 |
| 2005/0271275 A1 * | 12/2005 | Chang | | 382/176 |
| 2006/0053466 A1 * | 3/2006 | Ikeda | | 725/133 |
| 2007/0070088 A1 * | 3/2007 | Oishi | | 345/629 |
| 2007/0070412 A1 * | 3/2007 | Kawara | | 358/1.15 |
| 2007/0127085 A1 * | 6/2007 | Mori | | 358/403 |
| 2010/0054599 A1 * | 3/2010 | Itonori | | 382/177 |
| 2010/0207946 A1 * | 8/2010 | Roseborough et al. | | 345/440 |
| 2010/0245887 A1 * | 9/2010 | Nguyen et al. | | 358/1.15 |
| 2010/0315431 A1 * | 12/2010 | Smith et al. | | 345/619 |
| 2012/0047176 A1 * | 2/2012 | Timmons | | 707/780 |
| 2012/0102388 A1 * | 4/2012 | Fan | | 715/234 |
| 2013/0011055 A1 * | 1/2013 | You et al. | | 382/165 |
| 2013/0205202 A1 * | 8/2013 | Xiao et al. | | 715/249 |

* cited by examiner

*Primary Examiner* — Wenpeng Chen
(74) *Attorney, Agent, or Firm* — Dority & Manning, P.A.

(57) ABSTRACT

Methods, systems and computer-readable storage mediums encoded with computer programs executed by one or more processors for rendering text within an image are disclosed. A block of text is segmented into a plurality of text segments, wherein each text segment comprises a sequence of characters. On each of a plurality of threads running in parallel, a text bitmap is generated for a respective text segment from the plurality of text segments, the text bitmap illustrating the sequence of characters for the respective text segment. Each of the text bitmaps are composited with an image bitmap of a source image, wherein the composited image bitmap comprises a rendering of the block of text onto the source image.

20 Claims, 5 Drawing Sheets

MULTI-THREADED TEXT RENDERING

BACKGROUND

1. Field

The embodiments herein relate generally to rendering text using multiple threads.

2. Background Art

With the advent of multi-threaded processing, the speed and capabilities of computers have increased. Multi-threaded processing allows not only multiple tasks to be run concurrently on a computing device, such as a computer or mobile phone. As a result, multi-threaded processing often allows for increased computing speed amongst one or more tasks to be run on a computing device.

Graphics or image processing is a resource intensive task. Image processing often involves rendering text onto an image on a monitor or screen of the computing device. Systems and methods are needed to increase the speed at which the text may be rendered.

BRIEF SUMMARY

According to an example embodiment, a method for rendering text with an image is provided. As part of the method, a block of text is segmented into a plurality of text segments, wherein each text segment comprises a sequence of characters. On each of a plurality of threads running in parallel, a text bitmap is generated for a respective text segment from the plurality of text segments, the text bitmap illustrating the sequence of characters for the respective text segment. Each of the text bitmaps are composited with an image bitmap of a source image, wherein the composited image bitmap comprises a rendering of the block of text onto the source image.

Examples of system and computer program product embodiments are also disclosed. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Disclosed herein is a system for multi-threaded text rendering. The system described herein improves the processing speed of the historically time intensive task of image processing. More specifically, the system allows for a faster processing time, e.g., the time between the start of the task and the completion of the task of rendering text onto an image. As will be described in greater detail below, the system divides the task of rendering a block of text onto an image, into multiple subtasks. The system then utilizes multi-processing capabilities by assigning each sub-task to a different processing thread, so that each task may be executed in parallel. The system then aggregates the results of the sub-tasks into a final product which is a block of text rendered onto an image, in a fraction of the processing time required by other conventional systems.

While the present description is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Figure 1:
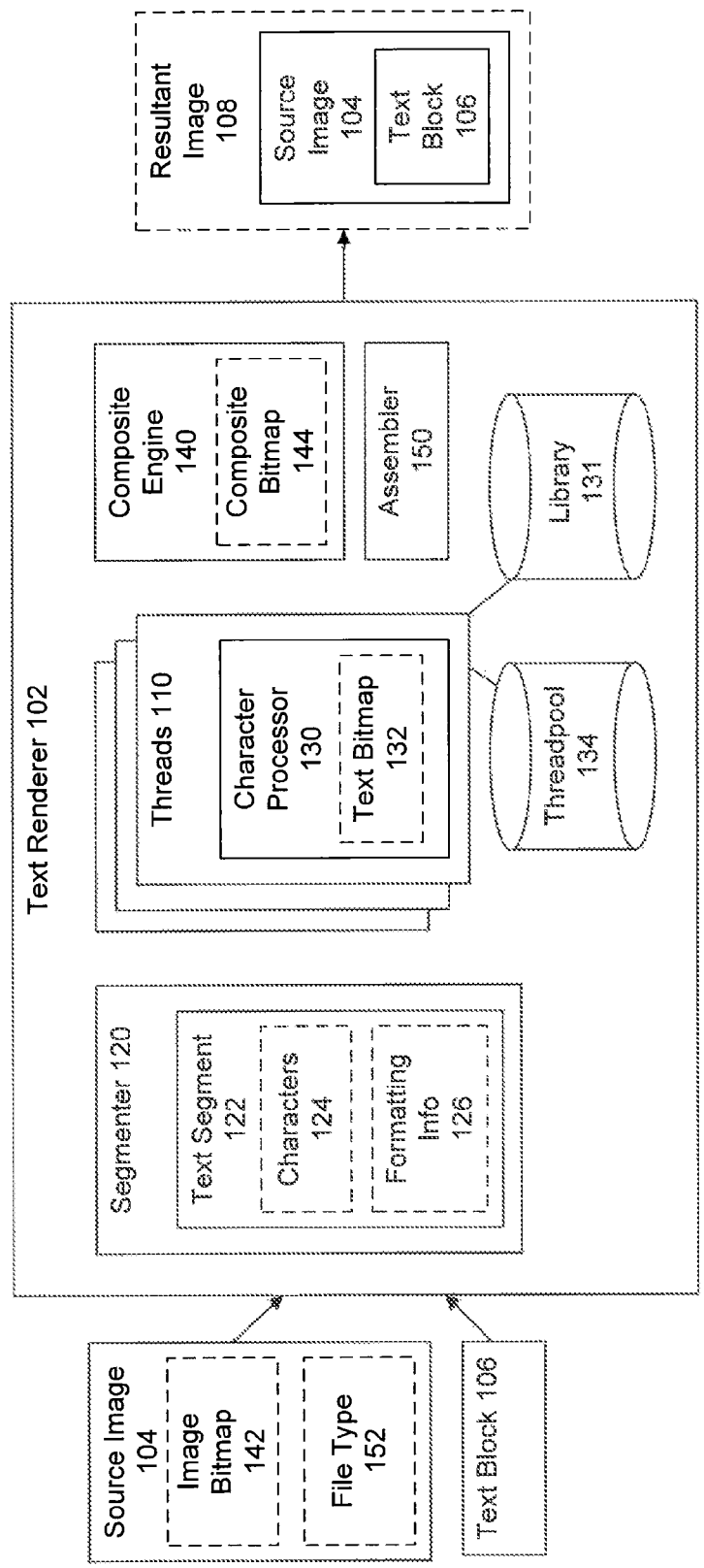
FIG. 1 is a block diagram illustrating a system for multi-threaded text rendering, according to an embodiment.

FIG. 1 is a block diagram illustrating a system 100 for multi-threaded text rendering, according to an embodiment. System 100 utilizes multiple threads to composite text onto an image. For example, system 100 may combine a user-provided label to an image of a map. The label may identify a particular feature or location on the map. Using multi-threaded processing, system 100 may composite or embed the label onto the map and produce a final map image with the label in place. System 100 utilizes multiple threads that may execute in parallel (e.g., multi-processing capabilities) to increase the speed at which text is processed and composited with an image.

System 100 may include a text renderer 102 that receives a source image 104 and a text block 106 and produces a resultant image 108, utilizing multiple processors or threads 110. Text renderer 102 may include a system of one or more processors that receives as input, text block 106 and source image 104 that are to be combined into a single image. Text renderer 102 may then output, as a result of the multi-threaded processing using threads 110, resultant image 108 which may include text block 106 composited with source image 104.

Source image 104 may include any electronic image or rendering. Source image 104 may include for example, a digital photograph, a rendering of a geographical area of a map, a scanned document, or other image.

Text block 106 may include any sequence of text to be included with source image 104. Text block 106 may include any string or sequence of characters, written in any language. Text block 106 may include any number of printable characters, including both alpha-numeric and non-alpha-numeric characters. For example, a first text block 106 may include alpha-numeric text, such as from the English language, a second text block 106 may include non-alpha-numeric text, such as Kanji as may be used in writing Japanese, and a third text block 106 may include both English and Kanji characters. The text from text block 106 may be written on one or multiple lines and include variations in font, bolding, italics, underlining, font sizes, colors, or other visual appearances. Text block 106 may include text from different languages and may include special symbols often used in word processing such as ©, Ω, ∈ and §.

A segmenter 120 segments, divides or otherwise partitions text block 106 into multiple text segments 122. Text segment 122 may include text from text block 106. According to an example embodiment, each text segment 122 may correspond to a line of text from text block 106. For example, segmenter 120 may read the characters from text block 106 into characters 124 of a first text segment 122. Then upon processing an end-of-line character, segmenter 120 may continue reading characters from text block 106 into a second text segment 122 until a next end-of-line character is processed. Segmenter 120 may then repeat this process until, all of the characters or other text from text block 106 has been processed or divided into a text segment 122.

Segmenter 120 may use any criteria by which to determine text segments 122, including, but not limited to, end-of-line characters, blank characters, and every nth character. In another example, embodiment, segmenter 120 may divide text block 106 into equal or approximately equal text segments 122 based on a number of threads 110 available for processing (as discussed below).

Each text segment 122 may include one or more characters 124 and formatting information 126. Characters 124 may include whatever character(s) are included text segment 122, from text block 106. Characters 124 may include any standardized format of characters 124 included in each text block 122. For example, characters 124 may include ASCII codes corresponding to each character from text block 106. Characters 124 may include the special symbols discussed above, and may include blank space and end-of-line characters as well.

Formatting information 126 may include any information pertaining to the visual appearance of characters 124. Formatting information 126 may include, for example, bolding, italics, underlining, font, color, size, horizontal alignment, vertical alignment, spacing, or other visual appearance information on how text (e.g., from text block 106, text segment 122, or characters 124) is be rendered or composited with source image 104. According to an example embodiment, each text segment 122 may have its own formatting information 126, formatting information 126 may be the same for each text block 106, or individual characters 124 within text segments 122 may have their own formatting information 126.

Text renderer 120 may use threads 110 to perform multi-threaded processing of text segments 122. Threads 110 may be executed on processing units (e.g., from one or more processors) that can be used to execute one or more tasks. A processing unit or process may be either have a single sequential thread of execution or an instance of a program having multiple threads of execution. For example, a processing unit may include a multi-core processor. The multi-core processor may be a single computing unit with two or more processors (or cores) that read and execute program instructions. Each processor or core may then provide a thread 110 for execution.

Threads 110 may include threads that execute concurrently or in parallel. For example, a first thread 110 may process a first text segment 122, while a second thread 110 processes a second text segment 122. Threads 110 may receive text segments 122 from segmenter 120 or a memory unit (not shown), and process text segments 110 to determine text bitmap 132.

Threads 110 may be selected from a threadpool 134. Threadpool 134 may include multiple threads 110 available for processing. The number of threads available in threadpool 134 may be determined based on the number of processors operating on text renderer 102, or the allocated processing capacity. For example, text renderer 102 may be operating on a machine with five processors, however only four of those processors may be allocated to text renderer 102. Then for example, threadpool 134 may include four threads 110 that may be executed in parallel to produce up to four text bitmaps 132, simultaneously.

Allowing processing on multiple threads 110 executing in parallel, allows system 100 to significantly speed up execution time in generating text bitmaps 132 from text segments 122 as will be discussed in greater detail below. Conventional systems may use a single thread, or a single processor, to convert text block into a large bitmap for the entire text block. Such a process can become quite time consuming. Text renderer 102, by contrast, divides text block 106 into smaller text segments 122 and then assigns each text segment 122 to one of the threads 110 from threadpool 134. The threads 110 assigned or provided text segments 122 may then process the text segments 122 in parallel to produce a text bitmap 132 for each text segment 122. As a result, text renderer 102, utilizing multi-threaded text rendering, may generate text bitmaps 132 for a text block 106 in a fraction of the time when compared to conventional systems.

Each thread 110 may operate or otherwise be configured to operate as a character processor 130. Character processor 130 may operate to coordinate the processing of a text segment 122 into a text bitmap 132 for a thread 110. Character processor 130 may process text segment 122 on a character-by-character (e.g., characters 124) basis. For example, character processor 130 may generate for each of the characters 124 of text segment 122 a glyph, wherein the glyph may include a representation of a character 124 including the formatting information 126. Then, for example, library 131 may generate a character bitmap (not shown) for each glyph provided by character processor 130. Library 131 may be a font library that is generates individual character bitmaps from glyphs of the characters 124. The character bitmap may include the visual appearance of a character 124, as determined from formatting information 126.

Character processor 130 may then combine the individual character bitmaps into text bitmap 132. According to an example embodiment, as each character bitmap is produced from library 131, character processor 130 may add or otherwise append the character bitmap to text bitmap 132. Character processor 130 may, after adding a first character bitmap (i.e., of a first character 124) to text bitmap 132, process the space between the end of a first character and the beginning of the next character (e.g., next character bitmap). In an example embodiment, depending on the font being used, the spaces between characters 124, even of the same word, may vary depending on which characters 124 appear. Character processor 130 may then process the space between each character 124 to create an accurate representation of the corresponding text segment 122. For example, if text segment 122 includes characters 124 that read "test chars", then character processor 130 may, after adding the character bitmap for the character "t" to text bitmap 132, process the space between the characters "t" and "e". Character processor 130 may determine the pixel or bit length between characters, and add that space to text bitmap 132 prior to processing the subsequent character bitmap for "e".

A bitmap (e.g., such as text bitmap 132, image bitmap 142 and composite bitmap 144) may include a mapped array of bits or pixels used to render images. More specifically, text bitmap 132 may include an image file used to store characters 124 of text segment 122 as to be rendered on source image 104. Each text segment 122 may correspond to a different text bitmap 132 as generated by a separate thread 110.

Composite engine 140 may then composite text bitmaps 132 with image bitmap 142 to generate composite bitmap 144. Image bitmap 142 may include a bitmap similar to text bitmap 132. Rather than having a bitmap of a text segment 122 as is the case with text bitmap 132, image bitmap 142 may include a bitmap of source image 104. The bitmaps 132, 142, 144 may include visual rendering information about pixels or bits to be rendered to a monitor or screen. Such visual rendering information may include, color, a color depth (e.g., how many bits per pixel), greyscale, or transparency information. According to an example embodiment, bitmaps 132, 142, 144 may be stored in a bitmap file such as a BMP file format.

Composite engine 140 may combine text bitmaps 132 with image bitmap 142 to generate composite bitmap 144. Composite bitmap 144 may share the bitmap file attributes described above with reference to bitmaps 132 and 142. According to an example embodiment, composite engine 140 may overlay first text bitmap 132 (e.g., corresponding to a first portion of text block 106) onto image bitmap 142. The first text bitmap 132 may be positioned on image bitmap 142 in accordance with formatting information 126. For example, the first text bitmap 132 may be right-justified, left-justified or center justified, or otherwise arranged in a particular vertical position on image bitmap 142. Composite engine 140 may then repeat a similar process for a second, third, fourth and however many other text bitmaps 132 as may be generated. Composite bitmap 144 may include a bitmap representing a rendering of text block 106 onto source image 104, in a particular position or with specified formatting.

According to an example embodiment, composite engine 140 may perform a bit BLIT (bit-block image transfer) when combining text bitmap 132 with image bitmap 142. A bit BLIT is an operation in computer graphics whereby several bitmaps may be combined. For example, in a bit BLIT, a source bitmap may be written to a destination bitmap whereby pixels of the destination are overwritten by the source. So in performing a bit BLIT, composite engine may overwrite bits of image bitmap 142 (destination) with bits from text bitmap 132 (source) to generate a first version of composite bitmap 144. Then, using the first version of composite bitmap 144 as the destination bitmap, composite engine 140 may perform a second bit BLIT using the next text bitmap 132 as the source. Composite engine 140 may then repeat this process using each subsequent text bitmap 132 as the source, until text block 106 has been rendered. In another example embodiment, composite engine 140 may combine all of the text maps 132 of all the text segments 122 prior to compositing with image bitmap 142, and then perform a single bit BLIT between the aggregated text bitmap (source) and image bitmap 142 (destination).

Assembler 150 may compress or format composite bitmap 144 into a particular image file type compression. For example, if source image 104 is of a particular image file type 152, assembler 150 may compress composite bitmap 144 into the same image file type 152, or to another image file compression. Example image file types include JPEG, GIF and PNG, though other source image file types are possible. According to an example embodiment, source image 104 may be received by text renderer 102 in a compressed image file type 152. Then for example, assembler 150 may determine file type 152 of source image 104 and decompress source image 104 to extract image bitmap 142.

Assembler 150 may, upon receipt of composite bitmap 144, compress (e.g., or recompress) composite bitmap 144 to produce resultant image 108, wherein resultant image 108 is of the same file type 152 as source image 104. For example, text renderer 102 may receive source image 104 as a JPEG file (e.g., file type 152), and a text block 106, and provide a resultant image 108 with the text block 106 rendered on the source image 104 as a JPEG file.

In another example embodiment, text renderer 102 may output composite bitmap 144 without recompression to file type 152, with recompression to a different image file type (as may be selected by a user), or may receive image bitmap 142 in its uncompressed or unformatted state. Composite bitmap 144, as discussed above, may nonetheless contain a bitmap corresponding to resultant image 108 with a rendering of text block 106 onto source image 104.

Figure 2:
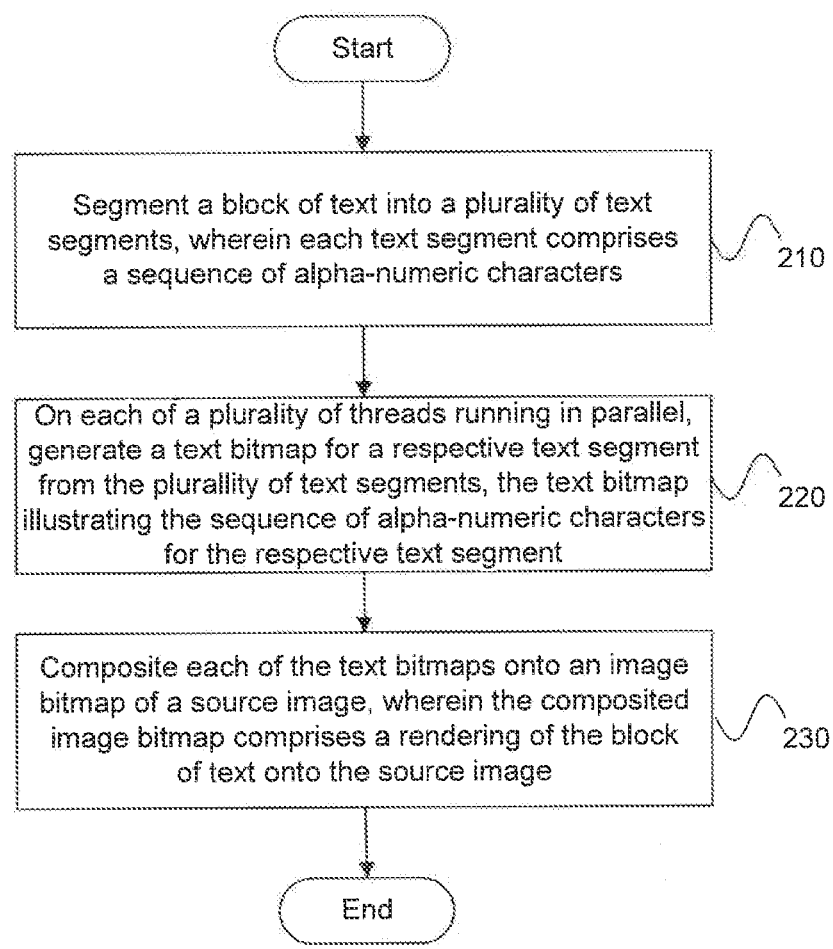
FIG. 2 is a flow chart of a process 200 of rendering text with an image, according to an example embodiment.

FIG. 2 is a flow chart of a process 200 of rendering text with an image, according to an example embodiment. While process 200 is described with respect to system 100 for illustrative purposes, it is not limited thereto.

At step 210, a block of text is segmented into a plurality of text segments, wherein each text segment comprises a sequence of alpha-numeric characters. For example, segmenter 120 may segment text block 106 into multiple text segments 122. Each text segment 122 may include a sequence of alpha-numeric characters 124.

At step 220, on each of a plurality of threads running in parallel, a text bitmap is generated for a respective text segment from the plurality of text segments, the text bitmap illustrating the sequence of alpha-numeric characters for the respective text segment. For example, threads 110 may be selected from threadpool 134 of parallel processing threads, and may generate a text bitmap 132 for each text segment 122.

At step 230, each of the text bitmaps are composited onto an image bitmap of a source image, wherein the composited image bitmap comprises a rendering of the block of text onto a source image. For example, composite engine 140 may composite the text bitmaps 132 produced by threads 110 onto image bitmap 142 of source image 104 to generate composite bitmap 144. Composite bitmap 144 may include a rendering of resultant image 108 including text block 106 rendered source image 104.

Figure 3:
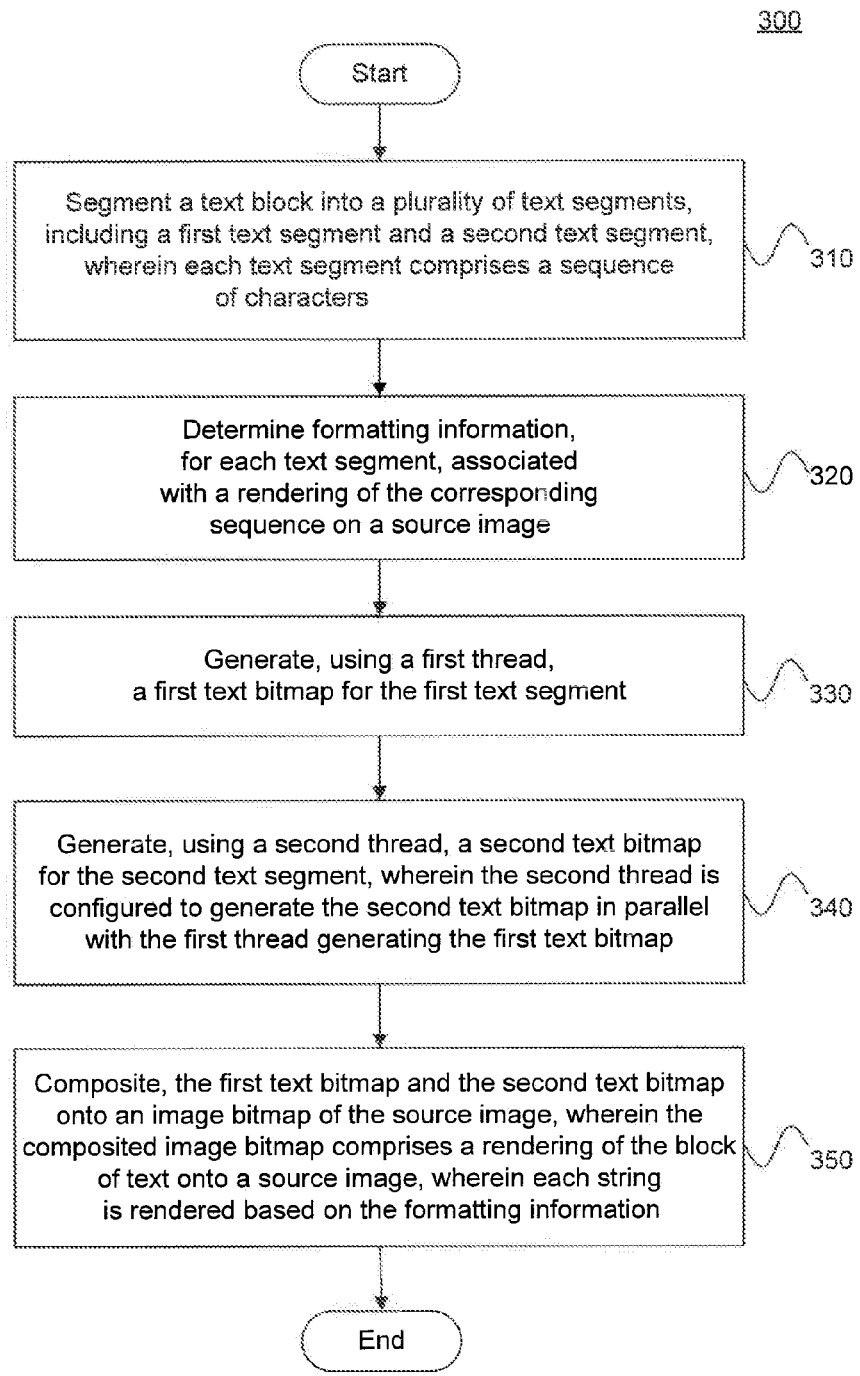
FIG. 3 is a flow chart of a process 300 of rendering text with an image, according to an example embodiment.

FIG. 3 is a flow chart of a process 300 of rendering text with an image, according to an example embodiment. At step 310, a text block is segmented into a plurality of text segments, including a first text segment and a second text segment, wherein each text segment comprises a sequence of characters. For example, segmenter 120 may segment text block 106 into multiple text segments 122 including a first and second text segment 122. Each text segment 122 may include a sequence of alpha-numeric and/or non-alpha-numeric characters 124.

At step 320, formatting information is determined for each text segment wherein the formatting information is associated with a rendering of the corresponding sequence on a source image. For example, segmenter 120 may determine formatting information 126 associated with each text segment 122.

At step 330, using a first thread, a first text bitmap for the first text segment is rendered. For example, a first thread 110 may generate a first text bitmap 132 for the first text segment 122.

At step 340, using a second thread, a second text bitmap is generated for the second text segment, wherein the second thread is configured to generate the second text bitmap in parallel with the first thread generating the first text bitmap. For example, a second thread 110 may generate a second text bitmap 132 for the second text segment 122. The first thread 110 and second thread 110 may be selected from threadpool 134, whereby threadpool 134 may include a pool of available threads for parallel execution.

At step 350, the first text bitmap and the second text bitmap are composited onto an image bitmap of the source image, wherein the composited image bitmap comprises a rendering of the block of text onto a source image, wherein each string is rendered based on the formatting information. For example, composite engine 140 may composite the text bitmaps 132 onto image bitmap 142 to produce composite bitmap 144. Composite engine 140 may do a bit BLIT to overwrite portions of image bitmap 142 with portions of the text bitmaps 132 to produce composite bitmap 144 including a resultant image 108 of text block 106 on source image 104.

Figure 4:
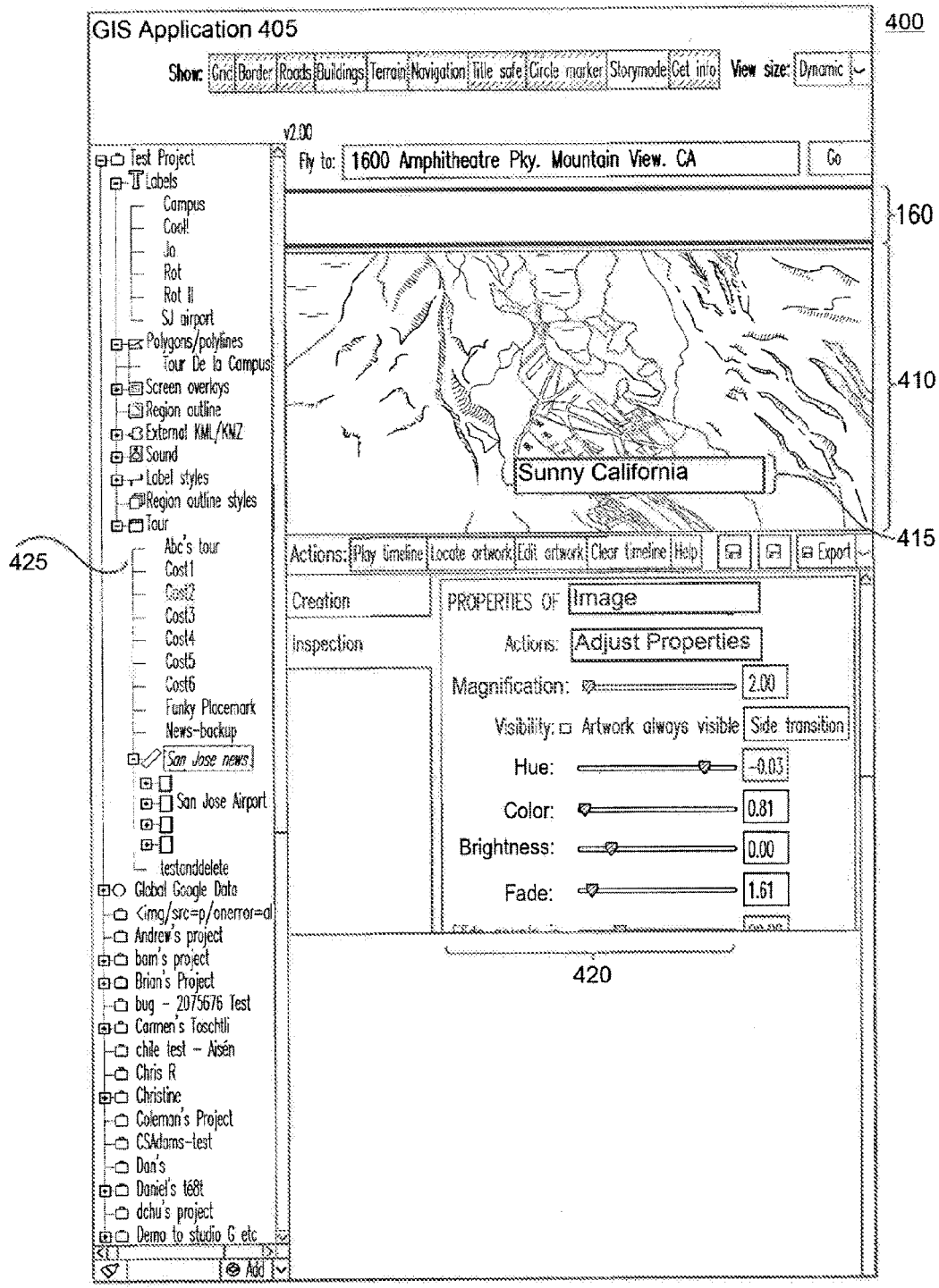
FIG. 4 is an example usage 400 of a multi-threaded text rendering system, according to an embodiment.

FIG. 4 is an example usage 400 of a multi-threaded text rendering system, according to an embodiment. Example usage 400 includes using a multi-threaded text rendering system 100 in a geospatial information system (GIS) application 405. GIS application 405 may include a geospatial or geographic application that allows a user to view different geographic areas or maps.

GIS application 405 may include an image pane 410. Image pane 410 may include an image of a geographic area or structure as produced by GIS application 405. For example, in image pane 410 an aerial view of a California town and mountains is shown. GIS application 405 may also include an image options pane 420, where various features of the image from image pane 410 may be toggled by a user.

GIS application 405 may also include an icon pane 425. Icon pane 425 may include icons and images, including labels, that may be dragged and dropped onto image pane 410 to be included on image 410. For example, as shown, user dragged label 415 onto image pane 410 and inserted the text "Sunny California".

According to an example embodiment, text renderer 102 may be embedded with or otherwise operating in coordination with GIS application 405. Then for example, when user enters label 415 to be embedded on the image from image pane 410, text renderer 402 may receive the image as source image 104 and label 415 as text block 106. Then for example, as discussed above, operating an a multi-threaded environment, text renderer 402 may output a resultant image 108 similar to that shown in image pane 410, wherein label 415 has been embedded into the aerial view of the city to create a singular image. The resultant image 108 may then be provided to GIS application 405 and rendered for a user.

It should be understood that GIS application 405 is only example usage of text renderer 102 and that text renderer 102 may be implemented in a variety of different environments or applications. For example, text renderer 102 may be used in conjunction with a drawing or photo editing application, in which a user wants to render text onto an image.

In another example embodiment, text renderer 102 may be implemented as a web-based or other network-based service. For example, a client may be operating GIS application 405 (or other application for which text is to be rendered on one or more images) on the client's local machine. Then, for example, a server on which text renderer 102 may be operating, may receive a request from the client's machine to perform multi-threaded text rendering as discussed herein. The server may perform the multi-threaded text rendering operations, or any portion thereof, and return the results to the client's that may be operating on which the client over the network or Internet.

In an example embodiment, text renderer 102 may be implemented on a photographic device such as a digital camera or mobile phone. For example, a user may take an image of a particular landmark while on vacation with a group of people. The user may desire to label the image with the place/time the image was taken or the people who appear in the image. Then for example, using his or her digital device, user may enter and embed a label or tag directly onto an image taken by, or otherwise stored on the device. For example, a picture taken in India in front of the Taj Mahal may read "Taj Mahal—2011—Best trip ever!!" Then for example, when user forwards the image to his/her friends, the image may include the label embedded on the image.

In another example embodiment, text renderer 102 may be used by a company, a professional photographer or news website to label images (e.g., to prevent copyright infringement). For example, a professional photographer may take images to be sold online. Each image may include a label with the photographer's contact and business information, such that potential purchasers cannot use the image without photographer's consent or allow potential purchasers to quickly determine who to contact so they may purchase a version of the image without the label.

Figure 5:
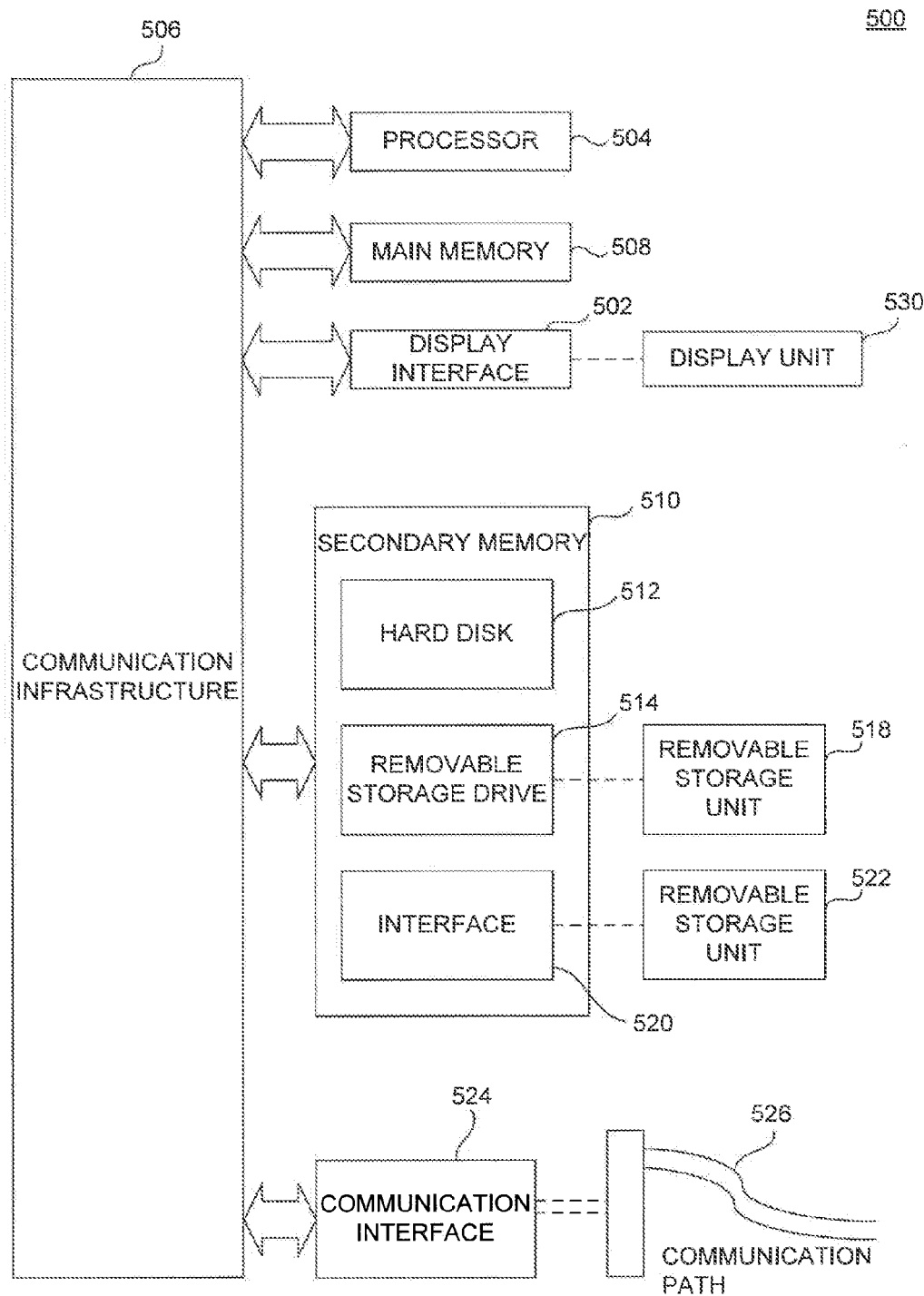
FIG. 5 illustrates an example computer system 500 in which embodiments of the present invention, or portions thereof, may be implemented as computer-readable code.

FIG. 5 illustrates an example computer system 500 in which embodiments of the present invention, or portions thereof, may by implemented as computer-readable code. For example, text renderer 102, including portions thereof, may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems or computer architectures. Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Main memory may include any kind of tangible memory. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software or data.

Computer system 500 (optionally) includes a display interface 502 (which can include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 or secondary memory 510. Computer programs may also be received via communications interface 524. Such computer programs, when executed, enable computer system 500 to implement the present invention as discussed herein. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for rendering text with an image comprising:
   receiving, by one or more computing devices, a source image;
   receiving, by the one or more computing devices, a separate block of text to be associated with the source image, wherein the block of text is not included in the source image when received;

segmenting, by the one or more computing devices, the block of text into a plurality of text segments, wherein each text segment comprises a sequence of alpha-numeric characters;

on each of a plurality of threads running in parallel, generating a text bitmap for a respective text segment from the plurality of text segments, the text bitmap illustrating the sequence of alpha-numeric characters for the respective text segment; and compositing, by the one or more computing devices, each of the text bitmaps with an image bitmap of the source image, wherein the composited image bitmap comprises a rendering of the block of text onto the source image.

2. The method of claim 1 wherein the segmenting comprises:

segmenting the block of text, wherein each text segment comprises a complete line of text from the block of text.

3. The method of claim 1 wherein the generating comprises:

creating a thread pool of the plurality of threads based on a number of available processor cores.

4. The method of claim 1 wherein the generating comprises:

determining formatting information for the block of text, wherein the formatting information includes a font-type for rendering the alpha-numeric characters onto the source image.

5. The method of claim 4 wherein the compositing comprises:

compositing each of the text bitmaps onto the image bitmap of the source image based on the formatting information, wherein the composited image bitmap comprises a rendering of the block of text in the font-type onto the source image.

6. The method of claim 1 wherein the generating comprises:

generating a first bitmap for a first text segment using a first thread of the plurality of threads; and generating a second bitmap for a second text segment using a second thread of the plurality of threads, wherein the first thread and the second thread generate, in parallel, the first bitmap and the second bitmap, respectively.

7. The method of claim 1 wherein the generating comprises, for each character of the alpha-numeric string:

generating a glyph for the character based on corresponding formatting information for the character; and adding the glyph to the text bitmap of the text block.

8. The method of claim 1 wherein the generating comprises:

determining a space between a first character of the alpha-numeric string of the text block and a second consecutive character of the alpha-numeric string of the text block, wherein the first character immediately precedes the second character by a length of the space; and adding the space to the text bitmap of the text block.

9. The method of claim 1 wherein the compositing comprises, for each generated text bitmap:

performing an image transfer between the text bitmap of a first text segment and the image bitmap of the source image.

10. The method of claim 1 wherein the source image comprises a view of a geographic area, and wherein the block of text comprises a geographic label describing at least a portion of the view of the geographic area.

11. The method of claim 1, further comprising, for each of the plurality of threads running in parallel, providing an individual character bitmap for each of the alpha-numeric characters included within the respective text segment, the text bitmap being generated by combining the individual character bitmaps.

12. A system for rendering text with an image comprising:

a segmenter configured to receive a source image and a separate block of text to be associated with the source image, the segmenter being further configured to segment the block of text into a plurality of text segments, wherein each text segment comprises a sequence of alpha-numeric characters and wherein the block of text is not included in the source image when received;

a plurality of threads running in parallel, each thread configured to generate a text bitmap for a respective text segment from the plurality of text segments, the text bitmap illustrating the sequence of alpha-numeric characters for the respective text segment; and a composite engine configured to composite each of the text bitmaps onto an image bitmap of the source image, wherein the composited image bitmap comprises a rendering of the text block onto the source image.

13. The system of claim 12, wherein the segmenter is further configured to determine formatting information for each of the text segments, wherein the formatting information comprises a font-type for rendering the alpha-numeric string on the source Image.

14. The system of claim 13 further comprising:

an assembler configured to generate, based on the composited image bitmap, a resultant image comprising the rendering of the text block on the source image, wherein the alpha-numeric string for each text segment is rendered based on its corresponding formatting information.

15. The system of claim 14 wherein the segmenter is configured to determine the image bitmap of the source image, based on a decompression of the source image from an image file-type, and the assembler is configured to compress the composited image bitmap into a resultant image, wherein the resultant image is of the image file-type.

16. The system of claim 12 wherein the segmenter is configured to:

determine an end of a first line of alpha-numeric characters of the text block; and extract the line of alpha-numeric characters as a first text segment of the plurality of text segments.

17. The system of claim 12 wherein the system is configured to:

determine a number of processors available for the processing; and create a threadpool of the plurality of threads based on the number available processors.

18. The system of claim 12 wherein the threads of the system are further configured to:

determine a width of the text segment, and generate the text bitmap of the alpha-numeric string, wherein the text bitmap is the width of the text segment.

19. A non-transitory computer readable storage medium having code stored thereon for rendering text that, when executed by one or more processors, causes the one or more processors to:

receive a source image;

receive a separate block, of text to be associated with the source image, wherein the block of text is not included in the source image when received;

segment the block of text into a plurality of text segments, including a first text segment and a second text segment, wherein each text segment comprises a sequence of characters;

determine formatting information, for each text segment, associated with a rendering of the corresponding sequence on the source image;

generate, using a first thread, a first text bitmap for the first text segment;

generate, using a second thread, a second text bitmap for the second text segment, wherein the second thread is configured to generate the second text bitmap in parallel with the first thread generating the first text bitmap; and composite, the first text bitmap and the second text bitmap onto an image bitmap of the source image, wherein the composited image bitmap comprises a rendering of the block of text onto the source image, wherein each string is rendered based on the formatting information.

20. The non-transitory computer-readable storage medium of claim 19 having code stored thereon for rendering text that, when executed by one or more processors, causes the one or more processors to:

segment the block of text into the plurality of text segments, including the first text segment and the second text segment, wherein each text segment comprises a sequence of non-alpha-numeric characters.

* * * * *